(12) United States Patent
Munson

(10) Patent No.: US 7,396,026 B1
(45) Date of Patent: Jul. 8, 2008

(54) SHOPPING CART BRAKE

(76) Inventor: Erik L. Munson, 928 Cranberry Cir., Fort Mill, SC (US) 29715

( * ) Notice: Subject to any disclaimer, the term of this patent is extended or adjusted under 35 U.S.C. 154(b) by 36 days.

(21) Appl. No.: 11/456,740

(22) Filed: Jul. 11, 2006

(51) Int. Cl.
*B62B 5/04* (2006.01)

(52) U.S. Cl. .................................. 280/33.994; 188/2 D

(58) Field of Classification Search ............. 280/33.991, 280/33.992, 33.994; 188/19, 31, 2 D
See application file for complete search history.

(56) References Cited

U.S. PATENT DOCUMENTS

| | | | | |
|---|---|---|---|---|
| 3,501,164 A | * | 3/1970 | Peterson ................ | 280/33.994 |
| 4,116,464 A | * | 9/1978 | Haley .......................... | 280/647 |
| 4,753,448 A | * | 6/1988 | Nagashima ................ | 280/264 |
| 4,976,447 A | | 12/1990 | Batson | |
| 5,288,089 A | * | 2/1994 | Bowers et al. ......... | 280/33.994 |
| 5,735,367 A | | 4/1998 | Brubaker | |
| 5,927,441 A | * | 7/1999 | Luo .............................. | 188/19 |
| 6,032,765 A | * | 3/2000 | Hsi-Chia ..................... | 188/19 |
| 6,123,343 A | | 9/2000 | Nolting | |
| 6,250,451 B1 | * | 6/2001 | Thirkill ....................... | 194/205 |
| 2005/0194219 A1 | * | 9/2005 | D'Arca et al. ................ | 188/19 |

* cited by examiner

Primary Examiner—Frank B Vanaman

(57) ABSTRACT

A cable operated shopping cart brake apparatus for fitting to an existing shopping cart or other like wheeled vehicle to provide selectively impeded movement. The cable assembly connects a master brake assembly to a slave brake assembly. The cable attachment on the master assembly is reversible, whereby in one mode the resting position of the actuator engages the cart brake, thereby impeding cart movement. The reversed mode provides disengagement of the brake in the rest position of the actuator. The actuator position is lockable so that the above 2 modes are possible. A button of the lock provides disengagement.

13 Claims, 4 Drawing Sheets

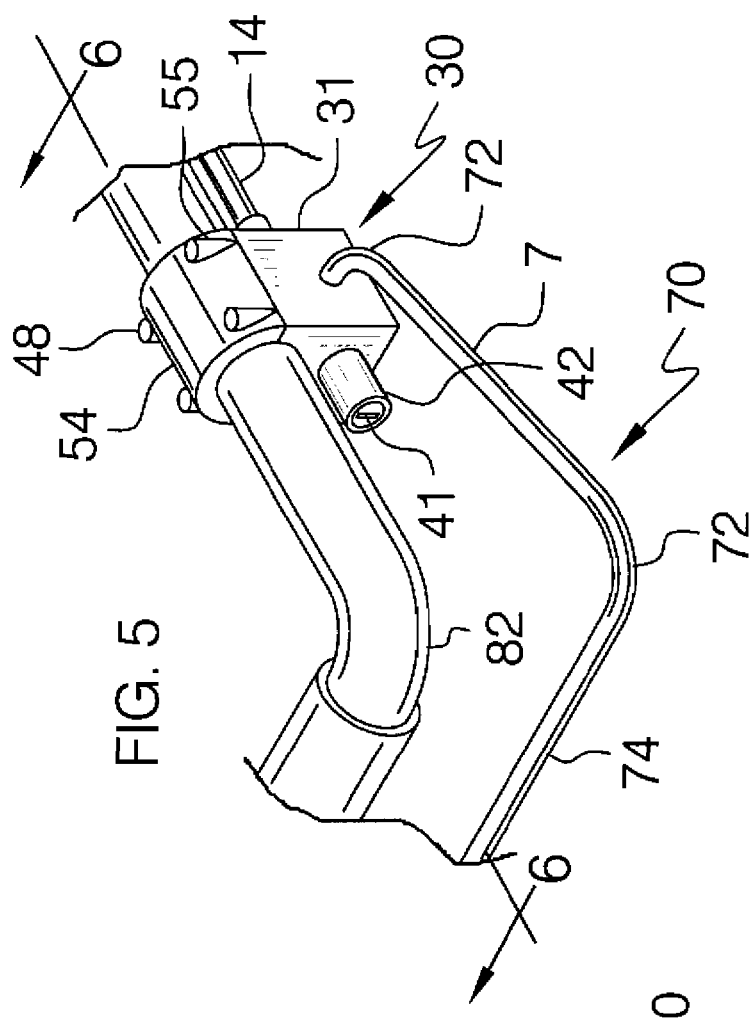
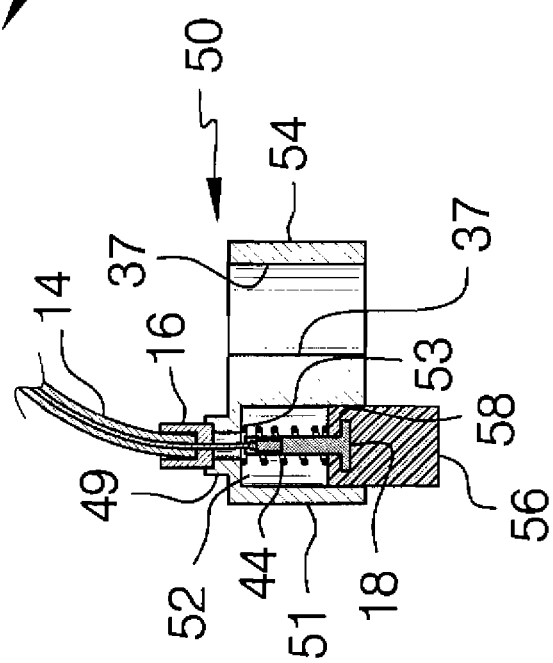
FIG. 5
FIG. 4

SHOPPING CART BRAKE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Hazard and inconvenience may be presented to both people and objects when grocery carts are allowed free movement. Cars are often damaged and carts sometimes collide with individuals as well. Resultantly, shopping cart braking devices have been developed. With the significant number of existing shopping carts, a retrofit breaking apparatus would be beneficial in solving the above problems. More specifically, a cable operated retrofit apparatus would offer the best solution to unimpeded cart movement.

FIELD OF THE INVENTION

The shopping cart brake apparatus relates to hand operated shopping cart brakes and more especially to a cable operated shopping cart brake which readily fits to an existing cart.

DESCRIPTION OF THE PRIOR ART

Prior related art is replete with various devices for impeding the movement of shopping carts. Some brake devices are a part of the manufactured cart. U.S. Pat. No. 5,735,367 issued to Brubaker on Apr. 7, 1998 teaches a shopping cart with brake. The brake is a part of the cart, and must be shielded to prevent personal contact and potential personal injury or entanglement with the brake mechanism. The brake includes a large pivotal handle mechanism and a rod actuation. U.S. Pat. No. 6,123,343 issued to Nolting, Jr. et al. on Sep. 26, 2000 teaches a cart and braking device of complex design and includes a pivotal actuation handle for encircling the cart handle. The above taught prior art requires specific rod sizing and anchorage to a cart, and therefore inclusion into the cart's manufacture. Neither above device offers braking for ready fit to an existing cart. U.S. Pat. No. 4,976,447 issued to Batson on Dec. 11, 1990 teaches a rod-actuated apparatus for restraining the movement of a wheeled cart. The mechanism differs from the current apparatus in several key features but most especially in that rigid rods attach the levers. Rigid rod attachments require exact lengths and angles of rods for the above prior art to function. The present apparatus' cable operation is without this limitation. The brakes themselves of the above prior art are also is pivotal devices and is therefore unlike the piston of the current apparatus.

While the above-described devices fulfill their respective and particular objects and requirements, they do not describe a shopping cart brake that provides for the advantages of the present shopping cart brake. In this respect, the present shopping cart brake substantially departs from the conventional concepts and designs of the prior art. Therefore, a need exists for an improved shopping cart brake.

SUMMARY OF THE INVENTION

The general purpose of the shopping cart brake, described subsequently in greater detail, is to provide a shopping cart brake which has many novel features that result in an improved shopping cart brake which is not anticipated, rendered obvious, suggested, or even implied by prior art, either alone or in combination thereof.

To attain this, the shopping cart brake apparatus 10 comprises a cable operated brake system for fit to an existing shopping cart or other wheeled vehicle wherein selectively impeded movement is desired. The apparatus is cable operated. The apparatus uses a master brake assembly and a slave brake assembly. The cable connects the master to the slave. One unique feature of the apparatus is that the cable attachment on the master assembly is reversible. The feature provides that the brake for the cart can be in one of two modes. The first mode of operation provides that the resting position of the apparatus engages the cart brake, whereby movement of the cart is impeded until the actuator is activated. The second mode of operation provides that the resting position of the apparatus disengages the brake, so that cart movement is unimpeded until the actuator is activated. Further, the actuator position is lockable so that the above modes are possible. A button of the lock provides engagement.

The unique cable operated apparatus provides for fit to existing carts, without the need for inclusion into a cart's manufacture. Further, no adjustment parts need to be included in the apparatus because location of the master and slave assemblies provides for adjusted installation.

The piston of the slave assembly of the apparatus produces the frictional braking force against a wheel of the cart. The piston is replaceable. The actuator in another embodiment of the apparatus offers a sufficient length and bends whereby two master assemblies and slave assemblies are used. This dual master and slave assembly embodiment offers braking of more than one wheel of a cart or other like vehicle requiring selectively impeded movement.

Thus has been broadly outlined the more important features of the improved shopping cart brake so that the detailed description thereof that follows may be better understood and in order that the present contribution to the art may be better appreciated.

An object of the shopping cart brake is to provide for attachment to most carts, especially shopping carts.

Another object of the shopping cart brake is to provide easy attachment to a cart.

A further object of the shopping cart brake is to provide for easy adjustment of the brake.

An added object of the shopping cart brake is to provide an embodiment which provides braking for more than one wheel.

And, an object of the shopping cart brake is to provide for locking of brake positioning with respect to a cart wheel.

A further object of the shopping cart brake is to provide for locking in a braking position.

Additionally, an object of the shopping cart brake is to provide for locking the brake in a released position.

These together with additional objects, features and advantages of the improved shopping cart brake will be readily apparent to those of ordinary skill in the art upon reading the following detailed description of presently preferred, but nonetheless illustrative, embodiments of the improved shopping cart brake when taken in conjunction with the accompanying drawings.

In this respect, before explaining the current embodiments of the improved shopping cart brake in detail, it is to be understood that the shopping cart brake is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved shopping cart brake.

It is therefore important that the claims be regarded as including such equivalent constructions insofar as they do not depart from the spirit and scope of the shopping cart brake. It is also to be understood that the phraseology and terminology employed herein are for purposes of description and should not be regarded as limiting.

BRIEF DESCRIPTION OF THE DRAWINGS

FIG. 4 is cross sectional view of FIG. 3, taken along the line 4-4.

FIG. 5 is a perspective view of the master assembly connected to the cart handle.

DETAILED DESCRIPTION OF THE DRAWINGS

With reference now to the drawings, and in particular FIGS. 1 through 6 thereof, the principles and concepts of the shopping cart brake apparatus generally designated by the reference number 10 will be described.

Figure 1:
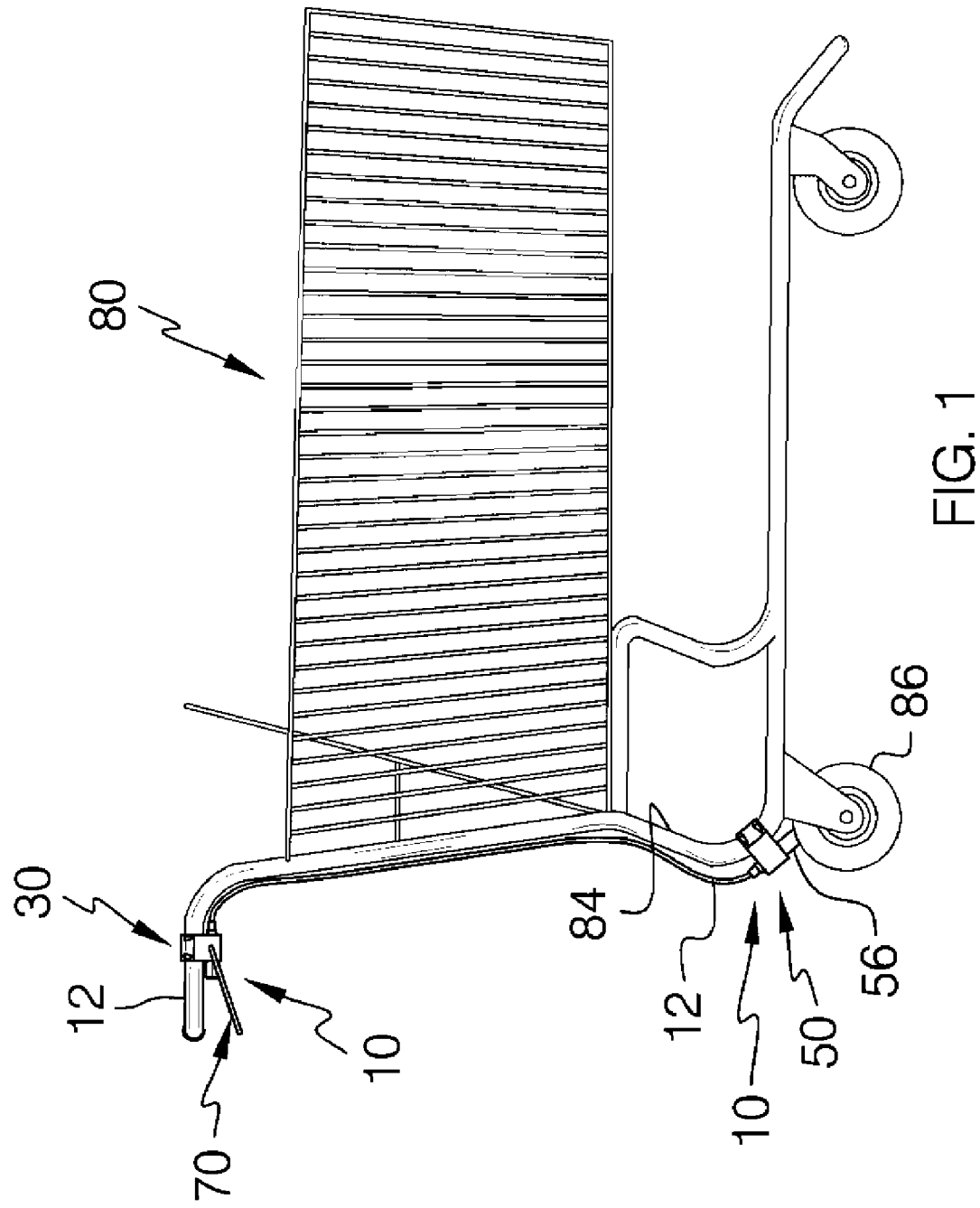
FIG. 1 is a side elevation view of the apparatus connected to a cart.
Figure 2:
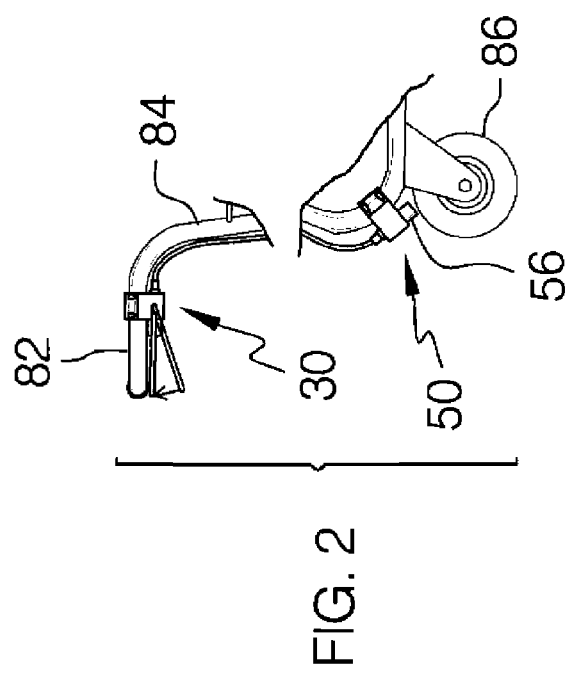
FIG. 2 is a side elevation view of a master assembly connected to a cart handle and a slave assembly connected to a cart frame.

Referring to FIGS. 1 and 2, the apparatus 10 comprises a shopping cart brake. The apparatus 10 is comprised of a master assembly 30 and a slave assembly 50 for attachment to the handle 82 or frame 84 of the cart 80. The cable assembly 12 connects the master 30 to the slave 50. The actuator, the master assembly 70 thereby provides actuation of the piston 56 against the wheel 86.

Figure 6:
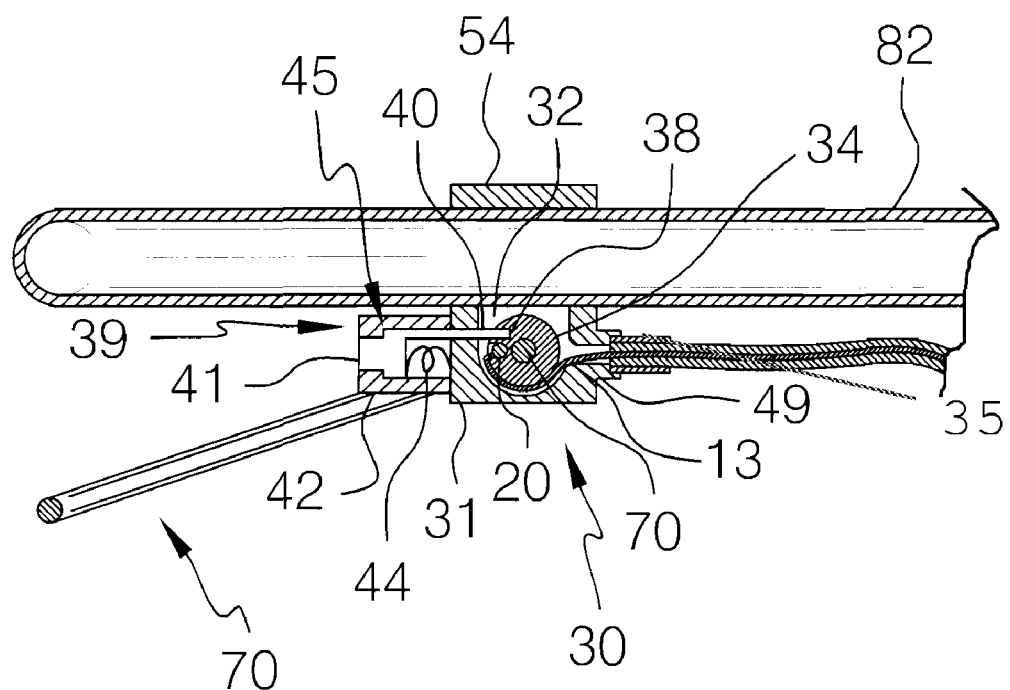
FIG. 6 is a cross sectional view of FIG. 5, taken along the line 6-6.

Referring to FIGS. 5 and 6, the master assembly 30 comprises a master body 31. A semicircular groove 37 is disposed in the master body 31. The groove 37 mates to a side of the cart handle 82. The half sleeve 54 of the master body 31 mates to a side of the cart handle 82 opposite the master body 31 of the master assembly 30. A plurality of buttresses 55 is incorporated into the half sleeve 54. The buttresses 55 provide strength of the connection of the half sleeve 54 to the master body 31 while allowing the half sleeve 54 to be thinner than would otherwise be possible. Each fastener 48 passes through a buttress 55 to affix the half sleeve 54 to the master body 31 around the cart handle 82. The design of the master assembly 30 provides for attachment where needed on the handle 82 or an appropriate frame 84 location. The master body 31 comprises a pivot chamber 32. The cylindrical pivot 34 is disposed within the pivot chamber 32. The actuator 70 is connected to the pivot 34. The first bend 72 in the actuator 70 is disposed proximal to the master body 31. An extension 73 extends from the first bend 72 to a second bend 72. The transverse 74 extends from the second bend. The transverse 74 is positioned parallel to the cart handle 82. The rod end 20 of the cable 13 connects to the pivot 34. Movement of the actuator 70 toward the handle 82 thereby increases the amount of cable 13 around the pivot 34 and within the master body 31. Doing so withdraws the piston 56 from wheel 86 contact, thereby releasing any impediment to the cart 80 movement. The cable 13 can be provided either as shown or reversed. Reversal of the cable 13 connection positions the cable 13 on top of the pivot 34, thereby providing that movement of the actuator 70 toward the cart handle 82 decreases the amount of cable 13 within the master body 31. In this reversed cable 13 arrangement, the brake piston 56 is positioned away from the wheel 86 until the actuator 70 transverse 74 is moved toward the handle 82 of the cart 80, thereby allowing piston 56 contact with the wheel 86.

The master body 31 is further comprised of a lock 39. The lock 39 partially comprises a lock button 41 which slides within the lock 39. The lock button 41 is prevented from escape from the lock 39 by the keeper mechanism 45. A lock pin 40 is extended from the lock button 41. The lock pin 40 is capable of insertion into the pivot lock foramen 38 of the pivot 34. A compression spring 44 is disposed within the lock 39. The compression spring 44 acts to release the lock pin 40 from the lock foramen 38 of the pivot 34. The compression spring 44 is not sufficiently strong to remove the lock pin 40 from the lock 39 until the pivot 34 is pivoted. The friction of the lock pin 40 in the lock foramen 38 prevents inadvertent removal. Therefore, once the lock button 41 is positioned within the foramen 38, it remains until the actuator 0 is moved, thereby allowing the spring 44 to remove the lock pin 40.

Referring to FIGS. 4 and 6, the flexible cable assembly 12 has two opposite ends. One end of the cable assembly 12 is fitted to the master body 31. One end of the cable assembly 12 is fitted to the slave body 51. The cable 13 within the cable assembly 12 has a rod end 35 and a flange end 18. The substantial portion of the cable 13 is within the sheath 14. Each end of the sheath 14 is terminated with a sheath cap 16. The rod end 35 of the cable 13 fitted to the pivot 34 within the master body 31. The sheath cap 16 is fitted to the cap seat 49 of the master body 31.

Figure 3:
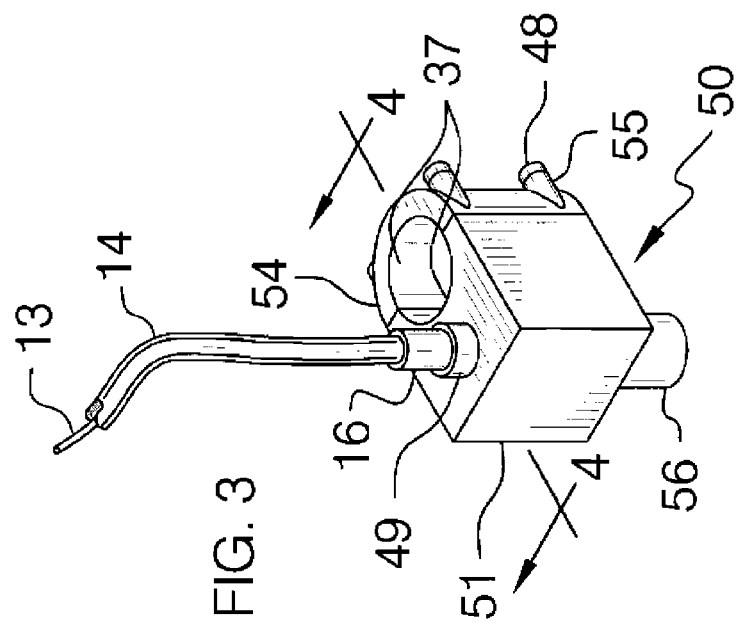
FIG. 3 is a perspective view of the slave assembly with cable assembly connected.

Referring to FIGS. 2, 3, and 4, the slave assembly 50 attaches to the frame 84 of the cart 80. The slave assembly 50 comprises a slave body 51 with a semicircular groove 37. The groove 37 mates to a side of the frame 84 of the cart 80. The half sleeve 54 of the slave body mates to a side of the frame 84 opposite the slave body 51. A plurality of buttresses 55 is incorporated into the half sleeve 54. A plurality of fasteners is provided for affixing the half sleeve 54 to the slave body 51 around the cart 80 frame 84. Each fastener 48 passes through a buttress 55. A bore 52 is disposed within the slave body 51. A bore seat 53 is disposed within the bore 52. The piston 56 is slideably disposed within the bore 52. The flange receptacle 58 is disposed within the piston 56. The flange receptacle 58 removably receives of the flange end 18 of the cable 13. The removable flange end 18 provides for piston 56 replacement. A compression spring 44 is disposed within the bore 52. The spring 44 acts to move the piston 56 away from the bore seat 53. Movement of a part of the piston 56 out of the bore 52 enables piston 56 contact with a wheel 86 of the cart 80, thereby impeding cart 80 movement.

A different embodiment of the apparatus 10 provides an actuator 70 extended to comprise two opposing ends, each end a mirror image of the other. With the extended actuator (not shown), a second master assembly 30 is provided and connected to the actuator 70. A second slave assembly 50 is provided and connected to the cart 80 frame 84. A second cable assembly 12 connects the second master assembly 30 to the second slave assembly 50. Movement of the actuator 70 provides dual wheel 86 braking and brake release for the cart 80.

With respect to the above description then, it is to be realized that the optimum dimensional relationships for the parts of the shopping cart brake, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the shopping cart brake.

Directional terms such as "front", "back", "in" "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the shopping cart brake may be used.

Therefore, the foregoing is considered as illustrative only of the principles of the shopping cart brake. Further, since numerous modifications and changes will readily occur to those skilled in the art, it is not desired to limit the shopping cart brake to the exact construction and operation shown and described, and accordingly, all suitable modifications and equivalents may be resorted to, falling within the scope of the shopping cart brake.

What is claimed is:

1. A cable actuated shopping cart brake for attachment to a wheeled shopping cart or the like, the cart brake comprising:
   a master assembly for attachment to a handle or a frame of the cart, the master assembly comprising:
      a master body;
      a groove in the master body, the groove for mating to a side of the cart handle;
      a half sleeve of the master body, the half sleeve for mating to a side of the cart handle opposite the master body of the master assembly;
      a plurality of fasteners for affixing the half sleeve to the master body, around the cart handle;
      a pivot within the master body;
      a flexible cable assembly having two ends, one end of the cable assembly fitted to the master body;
      a cable within the cable assembly, the cable having a rod end and a flange end;
      the rod end of the cable fitted to the pivot within the master body;
   an actuator, a part of the actuator pivotally fitted through the master assembly, the actuator connected to the pivot, whereby movement of the actuator rotates the pivot and alters the amount of cable within the master body;
   a slave assembly for attachment to the frame of the cart, the slave assembly comprising:
      a slave body;
      a groove in the slave body, the groove for mating to a side of the frame;
      a half sleeve of the slave body, the half sleeve for mating to a side of the frame opposite the slave body of the slave assembly;
      a plurality of fasteners for affixing the half sleeve to the slave body, around the frame;
      a bore within the slave body;
      a bore seat within the bore;
      a piston slideably disposed within the bore, the piston connected to the flange end of the cable;
      a compression spring within the bore, the spring acting to move the piston away from the bore seat,
   whereby movement of a part of the piston out of the bore enables piston contact with one of the wheels of the cart, thereby impeding cart movement.

2. The apparatus in claim 1 wherein the cable assembly further comprises:
   a cable;
   a sheath surrounding a substantial amount of the cable;
   a sheath cap on an end of each end of the sheath;
   a cap seat on the master assembly;
   a cap seat on the slave assembly.

3. The apparatus in claim 1 wherein the actuator of the apparatus comprises:
   a pivot connection connecting the actuator to the pivot within the master body;
   a first bend proximal to the master body;
   an extension extended from the first bend to a second bend;
   a transverse from the second bend, the transverse for positioning proximal to the cart handle.

4. The apparatus in claim 1 wherein the actuator is lockable.

5. The apparatus in claim 2 wherein the actuator is lockable.

6. The apparatus in claim 3 wherein the actuator is lockable.

7. A cable actuated shopping cart brake for attachment to a wheeled shopping cart, the cart brake comprising:
   a master assembly for attachment to a handle or a frame of the cart, the master assembly comprising:
      a master body;
      a groove in the master body, the groove for mating to a side of the cart handle;
      a half sleeve of the master body, the half sleeve for mating to a side of the cart handle opposite the master body of the master assembly;
      a plurality of buttresses incorporated into the half sleeve;
      a plurality of fasteners for affixing the half sleeve to the master body, around the cart handle, each fastener passing through a buttress;
      a pivot chamber within the master body;
      a cylindrical pivot within the pivot chamber;
      a flexible cable assembly having two ends, one end of the cable assembly fitted to the master body;
      a cable within the cable assembly, the cable having a rod end and a flange end;
      the rod end of the cable fitted to the pivot within the master body;
   an actuator, a part of the actuator movably fitted through the master assembly, the actuator connected to the pivot, whereby movement of the actuator rotates the pivot and alters the amount of cable within the master body;
   a slave assembly for attachment to the frame of the cart, the slave assembly comprising:
      a slave body;
      a groove in the slave body, the groove for mating to a side of the frame;
      a half sleeve of the slave body, the half sleeve for mating to a side of the frame opposite the slave body of the slave assembly;
      a plurality of buttresses incorporated into the half sleeve;
      a plurality of fasteners for affixing the half sleeve to the master body, around the cart handle, each fastener passing through a buttress;
      a bore within the slave body;
      a bore seat within the bore;

a piston slideably disposed within the bore, the piston connected to the flange end of the cable;

a compression spring within the bore, the spring acting to move the piston away from the bore seat, whereby movement of a part of the piston out of the bore enables piston contact with one of the wheels of the cart, thereby impeding cart movement.

8. The apparatus in claim 7 wherein the cable assembly further comprises:

a cable;

a sheath surrounding a substantial amount of the cable;

a sheath cap on an end of each end of the sheath;

a cap seat on the master assembly;

a cap seat on the slave assembly.

9. The apparatus in claim 7 wherein the actuator of the apparatus comprises:

a first bend in the actuator, proximal to the master body;

an extension extended from the first bend to a second bend;

a transverse from the second bend, the transverse for positioning parallel to the cart handle.

10. The apparatus in claim 7 wherein the actuator is lockable.

11. The apparatus in claim 8 wherein the actuator is lockable.

12. The apparatus in claim 9 wherein the actuator is lockable.

13. A cable actuated shopping cart brake for attachment to a wheeled shopping cart, the cart brake comprising:

a master assembly for attachment to a handle or a frame of the cart, the master assembly comprising:

a master body;

a groove in the master body, the groove for mating to a side of the cart handle;

a half sleeve of the master body, the half sleeve for mating to a side of the cart handle opposite the master body of the master assembly;

a plurality of buttresses incorporated into the half sleeve;

a plurality of fasteners for affixing the half sleeve to the master body, around the cart handle, each fastener passing through a buttress;

a pivot chamber within the master body;

a cylindrical pivot within the pivot chamber;

a lock foramen within the pivot;

a flexible cable assembly having two ends, one end of the cable assembly fitted to the master body;

a cable within the cable assembly, the cable having a rod end and a flange end;

the rod end of the cable fitted to the pivot within the master body;

an actuator connected to the pivot;

a first bend in the actuator, the first bend proximal to the master body;

an extension extended from the first bend to a second bend;

a transverse from the second bend, the transverse for positioning parallel to the cart handle;

whereby movement of the actuator rotates the pivot and alters the amount of cable within the master body;

a lock joined to the master assembly;

a lock button within the lock;

a lock pin extended from the lock button, the lock pin selectively inserted into the lock foramen in the pivot;

a compression spring within the lock, the compression spring acting to release the lock pin from the lock foramen of the pivot;

a slave assembly for attachment to the frame of the cart, the slave assembly comprising:

a slave body;

a groove in the slave body, the groove for mating to a side of the frame;

a half sleeve of the slave body, the half sleeve for mating to a side of the frame opposite the slave body of the slave assembly;

a plurality of buttresses incorporated into the half sleeve;

a plurality of fasteners for affixing the half sleeve to the master body, around the cart handle, each fastener passing through a buttress;

a bore within the slave body;

a bore seat within the bore;

a piston slideably disposed within the bore;

a flange receptacle within the piston, the flange receptacle for removable receipt of the flange end of the cable;

a compression spring within the bore, the spring acting to move the piston away from the bore seat, whereby movement of a part of the piston out of the bore enables piston contact with one of the wheels of the cart, thereby impeding cart movement.

\* \* \* \* \*